United States Patent Office 3,455,902
Patented July 15, 1969

3,455,902
NOVEL 1,5-BENZOTHIAZEPIN-4(5H)-ONES
John Krapcho, Somerset, N.J., assignor to E. R. Squibb & Sons Inc., New York, N.Y., a corporation of Delaware
No Drawing. Filed Oct. 12, 1966, Ser. No. 586,040
Int. Cl. C07d 93/40
U.S. Cl. 260—239.3   8 Claims

ABSTRACT OF THE DISCLOSURE

Compounds of the formula

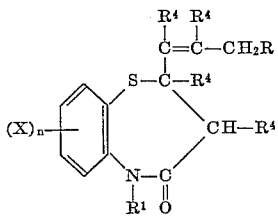

stereoisomers and salts thereof, wherein R is selected from the group consisting of hydrogen and $(X')_n$-substituted aryl; $R^1$ is selected from the group consisting of hydrogen, lower alkyl, lower alkenyl, lower alkynyl and the radical —AB wherein A is lower alkylene and B is a basic nitrogen containing radical selected from the group consisting of amino, lower alkyl amino, di(lower alkyl)amino, hydroxy-lower alkyl amino, di(hydroxy-lower alkyl)amino, phenyl-lower alkyl amino and saturated N-containing heterocyclics having 5 to 7 atoms in the ring selected from the group consisting of piperidyl, lower alkyl piperidyl, hydroxy piperidyl, lower alkoxy piperidyl, morpholino, lower alkyl morpholino, lower alkoxy morpholino, thiamorpholino, lower alkyl thiamorpholino, di(lower alkyl)thiamorpholino, lower alkoxy thiamorpholino, piperazyl, lower alkyl piperazyl, di(lower alkyl)piperazyl, lower alkoxy piperazyl, hydroxy-lower alkyl piperazyl, alkanoyloxy-lower alkyl piperazyl, di(lower alkyl)amino-lower alkyl piperazyl, di(lower alkyl)amino-lower alkoxy-lower alkyl piperazyl, aryl-piperazino, homopiperazino, lower alkyl homopiperazino, lower alkoxy homopiperazino and phenyl-lower alkyl homopiperazino, wherein the alkanoyl group consists of radicals containing up to 14 carbon atoms, and the aryl group is selected from the group consisting of phenyl, 3,4-methylenedioxyphenyl, 3,4-ethylenedioxyphenyl, furyl, thienyl, napthyl, and pyridyl; $R^4$ is selected from the group consisting of hydrogen and lower alkyl, at least three of $R^4$ being hydrogen; X and X' are each selected from the group consisting of hydrogen, lower alkyl, lower alkoxy, amino, di(lower alkyl)amino, halo lower alkylthio, hydroxy, cyano, nitro and trifluoromethyl; and $n$ is an integer from one to three. The compounds of this invention possess central nervous system modifying and antibacterial activity.

This invention relates to new chemical compounds having valuable therapeutic properties.

The therapeutically active compounds of this invention have the general formula

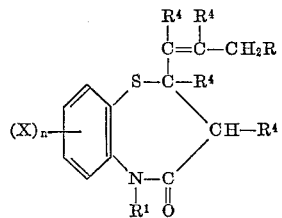

stereoisomers and salts thereof, wherein R is selected from the group consisting of hydrogen and $(X^1)_n$-substituted aryl; $R^1$ is selected from the group consisting of hydrogen, lower alkyl, lower alkenyl, lower alkynyl and the radical —AB wherein A is lower alkylene and B is a basic nitrogen containign radical; $R^4$ is selected from the group consisting of hydrogen and lower alkyl, at least three of $R^4$ being hydrogen; X and X' may be the same or different and are selected fro mthe group consisting of hydrogen, lower alkyl, lower alkoxy, amino, di(lower alkyl)amino, halo, lower alkylthio, (e.g., $CH_3CH_2CH_2S—$), hydroxy, cyano, nitro and trifluoromethyl; and $n$ is an integer from one to three.

Among the suitable radicals represented by the symbol B are amino, (lower alkyl)amino, such as methyl amino, ethyl amino and the like, di(lower alkyl)amino, such as dimethyl amino, diethyl amino and the like, (hydroxy-lower alkyl)amino, such as hydroxyethylamino and the like, di(hydroxy-lower alkyl)amino, such as di(hydroxyethyl)amino and the like, (phenyl-lower alkyl)amino, such as benzyl amino, phenethyl amino and the like, (lower alkyl), and saturated nitrogen heterocyclics having 5 to 7 atoms in the ring and which may have one additional hetero atom in the ring. A substitutent may also be attached to the nitrogen heterocyclic.

Heterocyclics represented by B are those having the formula

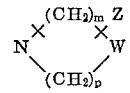

in which W represents NZ', $CH_2$, O or S, $m$ represents an integer from 1 to 4, $p$ represents an integer from 0 to 3, the total of $m+p$ being less than 7, Z represents hydrogen, lower alkyl, hydroxy, and lower alkoxy, and Z' represents hydrogen, lower alkyl, lower alkoxy, hydroxy-lower alkyl, alkanoyloxy-lower alkyl, alkanoyloxy-lower alkoxy lower alkyl, hydroxy-lower alkoxy-lower alkyl di(lower alkyl)amino-lower alkyl, di(lower alkyl)amino-lower alkoxy-lower alkyl, allyl, propargyl, cycloalkyl, cycloalkyl-lower alkyl, X-substituted phenyl, X-substituted phenyl-lower alkyl, and X-substituted phenyl-lower alkenyl (e.g., p-chlorocinnamyl. These may be exemplified by piperidyl [i.e., piperidino, 2-piperidyl, 3-piperidyl and 4-piperidyl]; (lower alkyl)piperidyl [e.g., 2,3, or 4-(lower alkyl)piperidino or 2, 3 or 4-(N-lower alkyl)piperidyl; or 2,3 or 4-(N-lower alkyl-2,3 or 4-(lower alkyl)piperidyl]; hydroxy piperidyl, such as hydroxy piperidino; (lower alkoxy)piperidyl; pyrrolidyl; (lower alkyl)pyrrolidyl; (lower alkoxy)pyrrolidyl; morpholino; (lower alkyl)-morpholino; di(lower alkyl)morpholino; (lower alkoxy)-morpholino; thiamorpholino; (lower alkyl)thiamorpholino; di(lower alkyl)thiamorpholino; (lower alkoxy)thiamorpholino; piperazyl; (lower alkyl)piperazyl (e.g., N⁴-methylpiperazino); di(lower alkyl)piperazyl; (lower alkoxy)piperazyl; (hydroxy-lower alkyl)piperazyl [e.g., N⁴-(2-hydroxyethyl) piperazino]; alkanoyloxy lower-alkyl piperazyl [e.g., N⁴-(2-acetoxyethyl)piperazino, N⁴-(2-heptanoyloxyethyl)piperazino, N⁴-(2-dodecanoyloxyethyl)piperazino]; (hydroxy-lower-alkoxy-lower alkyl)piperazyl [e.g., N⁴-(2-hydroxyethoxyethyl)piperazino]; di(lower alkyl)amino(lower alkyl)piperazyl [e.g., N⁴-dimethylaminoethylpiperazino]; di-(lower alkyl)amino-(lower alkoxy-lower alkyl)piperazyl [e.g., N⁴-(2-dimethylaminoethoxyethyl)piperazino]; aryl piperazino [e.g., N⁴-(o-methoxyphenyl)piperazino] and homopiperazyl and substituted homopiperazyl [e.g., N⁴-ethylhomopiperazino, N⁴-benzylhomopiperazino, N⁴-(p-hydroxyphenyl)homopiperazino, N⁴-(o-acetoxybenzyl)homopiperazino and N⁴-(hydroxyethyl)homopiperazino]. The terms "lower alkyl," "lower alkoxy," and "lower alkylene" as employed herein, include both straight and branched chain radicals of less than eight carbon atoms. The term "alkanoyloxy" includes radicals of up to 14 carbon atoms.

The term "aryl" as employed herein includes mononuclear and dinuclear radicals such as phenyl, substituted phenyl (including 3,4-methylenedioxyphenyl and 3,4-ethylenedioxyphenyl), furyl, thienyl, naphthyl or pyridyl.

It is readily apparent from the above that it is intended that the linkage between the hererocyclic radical (B) and the alkylene radical (A) may be through any carbon or nitrogen atom in the heterocyclic ring, and that Z may be linked to any position on the ring having a replaceable hydrogen atom.

The particularly preferred compounds of this invention are those wherein X and X' are hydrogen, R is hydrogen, and R' is selected from the group consisting of hydrogen, methyl, (diethylamino)ethyl, (dimethylamino)ethyl and 4-methyl-1-piperazinyl propyl.

This invention also includes salts of the above defined compounds having basic groups formed with non-toxic organic and inorganic acids. Such salts are easily prepared by methods known to the art. The base is reacted with either the calculated amount of organic or inorganic acid in aqueous miscible solvent, such as acetone or ethanol, with isolation of the salt by concentration and cooling or an excess of the acid in aqueous immiscible solvent, such as ethyl ether or chloroform, with the desired salt separating directly. Exemplary of such organic salts are those with maleic, fumaric, benzoic, ascorbic, pamoic, succinic, bismethylenesalicylic, methylsulfonic, ethanesulfonic, acetic, propionic, tartaric salicylic, citric, gluconic, lactic, malic, mandelic, cinnamic, citraconic, aspartic, stearic, palmitic, itaconic, glycolic, p-aminobenzoic, glutamic, benzene sulfonic, cyclohexylsulfamic, and theophylline acetic acids as well as with the 8-halotheophyllines, for example, 8-chlorotheophylline and 8-bromotheophylline. Exemplary of such inorganic salts are those with hydrochloric, hydrobromic, sulfuric, sulfamic, phosphoric and nitric acids. Of course, these salts may also be prepared by the classical method of double decomposition of appropriate salts which is well known to the art. Also included within the purview of this invention are the non-toxic quaternary ammonium salts which include those formed with alkyl halides (e.g., methyl chloride, isobutyl bromide, dodecyl chloride and cetyl iodide), benzyl halides (e.g., benzyl chloride) and dilower alkyl sulfates (e.g., dimethyl sulfate).

Compounds of this invention and the salts thereof possess central nervous system modifying activity, particularly as depressants and are therefore useful as tranquilizers. They may be administered orally or parenterally in the form of tablets, capsules, elixirs, injectables, or the like, by incorporating the appropriate dosage of the compound of Formula I or a physiologically acceptable salt thereof in a dosage range similar to that used with chlordiazepoxide. The compounds of this invention also have been found to possess antibacterial activity.

The compounds of this invention may be prepared by reacting a sorbic acid having the formula (II) 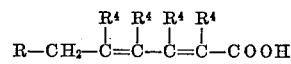

wherein R and R⁴ are as defined hereinabove, with a 2-aminobenzenethiol having the formula (III) 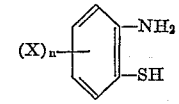

wherein X and n are as hereinabove defined, to yield an intermediate having the formula (IV) 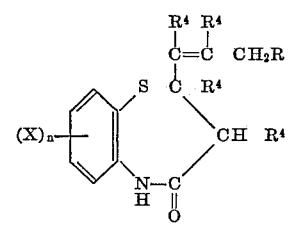

The compound of Formula IV may then be reacted in an inert solvent, such as toluene or tetrahydrofuran in the presence of a reagent such as sodamide, potassium butoxide, butyllithium, tritylithium, powdered sodium hydroxide and the like, with either a halide of the formula: R⁵-halide, wherein R⁵ is as hereinabove defined, with the exception of hydrogen, as R¹, or a sulfate such as dimethylsulfate to yield products of this invention having the formula (V) 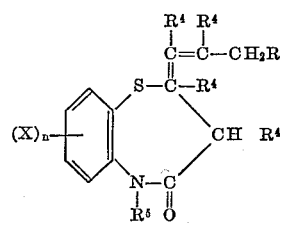

The compounds of Formula IV and V may additionally be reduced by treatment in the presence of a reducing agent such as lithium aluminum hydride to produce compounds of the formula (VI)

$$\begin{array}{c} R^4 \ R^4 \\ | \ | \\ C=C-CH_2R \\ \parallel \\ S-C-R^4 \\ \diagdown \\ CH-R^4 \\ \diagup \\ N-CH_2 \\ | \\ R^1 \end{array}$$

wherein R, R¹, R⁴, X and n are as hereinbefore defined.

Alternatively, in those cases in which R⁵ is —AB, the compounds of Formula IV are treated with a basically substituted alkyl halide of the formula B—A—halide wherein B and A are as hereinbefore defined, the reaction preferably being conducted in the presence of a basic condensation reagent. The same compounds can also be prepared in two steps, by first reacting with an alkylene dihalide of the formula halide—A—halide and then with a base of the formula BH.

If a final product is desired wherein X represents $NH_2$, such a product is prepared by reduction of the corresponding compounds according to Formulas V or VI wherein X represents $NO_2$.

Examples of 2-aminobenzenethiols starting materials are:
2-aminobenzenethiol,
5-propyl-2-aminobenzenethiol,
3,4-dimethoxy-2-aminobenezenethiol,
2-amino-6-nitrobenzenethiol,
5-dimethylamino-2-aminobenzenethiol,
6-chloro-2-aminobenzenethiol,
4-ethylthio-2-aminobenzenethiol,
3-hydroxy-2-aminobenzenethiol,
4-cyano-2-aminobenzenethiol,
2-amino-5-nitrobenzenethiol,
6-trifluoromethyl-2-aminobenzenethiol and the like.

Examples of starting materials in accordance with Formula II are:
sorbic acid,
2-methylsorbic acid,
6-(m-tolyl)sorbic acid,
6-(m-ethylphenyl)sorbic acid,
6-(o-nitrophenyl)sorbic acid,
6-[p-(propylthio)phenyl]sorbic acid,
6-(p-nitrophenyl)- sorbic acid,
6-(p-methoxyphenyl)sorbic acid,
6-(m-trifluoromethylphenyl) sorbic acid and the like.

The compounds of this invention may be obtained as mixtures of diastereoisomeric compounds or the salts thereof, which may be separated into the individual racemic compounds on the basis of physico-chemical differences, such as solubility, for example, by fractional crystallization, if necessary, of a derivative, e.g., an acid addition salt thereof. The racemates of the compounds of this invention may be resolved into the optically active d- and l-forms according to procedures known for the resolution of racemic compounds. For example, use of d-tartaric acid, dibenzoyl-d-tartaric acid, l-malic acid, d-camphorsulfonic acid and so forth.

The following examples are illustrative of the invention. All temperatures are stated in degrees centigrade unless otherwise stated:

EXAMPLE 1

2,3-dihydro-2-propenyl-1,5-benzothiazepin-4(5H)-one

A solution of 125.0 g. of 2-aminobenzenethiol and 112.0 g. of sorbic acid in 1 l. of toluene and 30 ml. of dimethylformamide is heated and then refluxed for 1 hour. The resulting dark solution is diluted with 200 ml. of ether and treated with a solution of 100 ml. of concentrated hydrochloric acid in 300 ml. of water. The yellow crystalline solid is removed by filtration and washed with ether.

The layers from the filtrate are separated, the organic phase is washed with water and 10% sodium bicarbonate solution and then dried over magnesium sulfate. The mixture is filtered and the solvent removed under reduced pressure to give 77 g. of a yellow-brown semi-solid. This material is digested in 120 ml. of hot diisopropyl ether and cooled to give 30.0 g. of pale yellow solids, M.P. 135–137°. After crystallization from 60 ml. of acetonitrile, the colorless solid weighs 27.9 g., M.P. 135–137°.

EXAMPLE 2

5-[2-(dimethylamino)ethyl]-2,3-dihydro-2-propenyl-1,5-benzothiazepin-4-(5H)one

A slurry of 4.0 g. sodamide in 400 ml. of toluene is treated with the amide from Example 1. A yellow-gray solution results in several minutes. After stirring for 30 minutes at room temperature, this solution is treated in a toulene solution of 25.0 g. 2-dimethylaminoethyl bromide. The mixture is stirred at room temperature and a precipitate begins to separate in about 30 minutes. After stirring for 7 hours at room temperature, the heavy slurry is allowed to stand overnight. The mixture is treated with 100 ml. of water and the organic phase washed with 50 ml. of water. The organic phase is extracted with a solution of 13 ml. of concentrated hydrochloric acid in 200 ml. of water. The aqueous phase is treated with a solution of 10 g. of sodium hydroxide in 50 ml. of water and the liberated base extracted with 150 ml. of ether (three times). The organic layers are combined, treated with magnesium sulfate and Darco, filtered and the solvent evaporated to give 22.7 g. of residue. After standing overnight, the residue is dissolved in 400 ml. of ether and the turbid solution treated with Darco, filtered and evaporated to give 22.5 g. of residue.

Purification of the residue is achieved through the preparation of an oxalic acid salt thereof by treating a solution of 20.3 g. of base in 50 ml. of warm isopropyl alcohol with a solution of 6.3 g. of oxalic acid in 30 ml. of isopropyl alcohol. A crystalline product separates from the pale yellow solution after several minutes. The mixture is cooled and filtered to give 22.0 g. of nearly colorless solid, M.P. 141–143°. Recrystallization from 110 ml. of isopropyl alcohol gives 21.0 g. of nearly colorless solid, M.P. 141–143°.

EXAMPLE 3

5-[2-(diethylamino)ethyl]-2,3-dihydro-2-propenylbenzothiazepin-4(5H)one, salt with one mole of citric acid To a slurry of 4.0 g. of sodamide in 300 ml. of toluene is added 22.0 g. The resulting pale yellow solution is stirred at room temperature for 30 minutes, treated with 60 ml. of 2.0 N of 2-diethylaminoethyl chloride in toluene and then maintained at 60–70° for 5 hours. After cooling to room temperature, the product is isolated in the same manner as in Example 2 to give 26.3 g. of base as a syrupy oil.

A solution of 14.6 g. of the distilled base (B.P. 175–180° at 0.3 mm.) in 25 ml. of ethanol is added to a suspension of 9.6 g. of citric acid monohydrate in 25 ml. of ethanol. This mixture is then warmed to obtain a solution and diluted to 200 ml. with ether. The product initially separated as an oil which slowly crystallizes to give 23.4 g. of nearly colorless product, M.P. 95–100°.

EXAMPLE 4

2,3-dihydro-5-[3-(4-methyl-1-piperazinyl)propyl]2-propenyl-1,5-benzothiazepin-4(5H)-one, dihydrochloride Twenty-two grams of 2,3-dihydro-2-propenyl-1,5-benzothiazepin-4(5H)-one, 16 g. of powdered sodium hydroxide, and 50 g. of 1-(3-bromopropyl)-4-methylpiperazine dihydrobromide are reacted in 300 ml. of toluene and heated on a steam bath for 30 minutes. The product is isolated in the manner described in Example 2 to give the crude base (30.5 g.) which is then distilled to give 26 g. of viscous oil; B.P. 214–218°/0.2 mm.

The base is taken up in 100 ml. of absolute alcohol, cooled, treated with 20 ml. of 7.7 N alcoholic hydrogen chloride, and diluted with ether to give 31 g. of yellowish material; M.P. 169–172° (dec.). Crystallization from 100 ml. of acetonitrile (Darco-treated) gives 21 g. of nearly colorless product, M.P. 176–178° (dec.).

EXAMPLE 5

2,3-dihydro-5-methyl-2-propenyl-1,5-benzothiazepin-4(5H)-one

To a suspension of 4.0 g. of sodamide in 300 ml. of toluene is added 22.0 g. of 2,3-dihydro-2-propenyl-1,5-benzothiazepin-4(5H)-one from Example 1 and the resulting solution is treated with 25.0 g. of dimethylsulfate in 100 ml. of toluene. The temperature of the mixture rises from 20 to 40° and a gelatinous precipitate separates. The mixture is maintained at 60–70° for 5 hours, cooled and treated with 200 ml. of water. The organic phase is washed with 100 ml. of water (three times), dried over magnesium sulfate and concentrated under reduced pressure. The residue (24.5 g.) is rapidly distilled at 160–170° (0.2 mm.) and the distillate fractionated to give 18.2 g. of pale yellow product, B.P. 147–150° (0.1 mm.). Crystallization of this material from 140 ml. of hexane gives 17.0 g. of nearly colorless product, M.P. 81–84°. After recrystallization from 130 ml. of hexane (with Darco treatment), the colorless crystalline product weighs 15.8 g., M.P. 81–84°.

EXAMPLE 6

2,3,4,5-tetrahydro-2-propenyl-1,5-benzothiazepine, hydrochloride

To a suspension of 5.0 g. of LiAlH₄ in 300 ml. of dry tetrahydrofuran is stirred and treated portionwise with 22.0 g. of 2,3 - dihydro-2-propenyl-1,5-benzothiazepin-4(5H)-one. The mixture becomes warm, is refluxed for 8 hours, cooled in an ice bath and then treated dropwise with 10 ml. of water followed by a solution of 4 g. of sodium hydroxide in 20 ml. of water. After stirring this mixture for 2 hours, it is filtered and the inorganic salts washed with ether. The filtrate is dried over magnesium sulfate, filtered and the filtrate concentrated under reduced pressure to give 19.2 g. of yellow syrupy residue. A solution of this material in 40 ml. of ethanol is treated with 29.0 ml. of 3.2 N hydrogen chloride. The hydrochloride crystallizes from this solution, is diluted with 100 ml. of ether, cooled and filtered to give 20.9 g. of pale yellow product, M.P. 205–208°. After crystallization from 130 ml. of ethanol, the nearly colorless material weighs 15.1 g., M.P. 207–210°.

EXAMPLE 7

5-[2-(4-morpholinyl)ethyl]-2,3-dihydro-2-propenyl-1,5-benzothiazepin-4(5H)-one

Following the procedure of Example 2, but substituting an equivalent amount of 2-(4-morpholinyl)ethyl bromide for the 2-diethylaminoethyl bromide, the desired product is obtained.

EXAMPLE 8

5-[2-(dimethylamino)ethyl]-2,3-dihydro-2-[3-(p-methoxyphenyl)propenyl]-1,5-benzothiazepin-4(5H)-one Following the procedure of Examples 1 and 2, but substituting an equivalent amount of 6-(p-methoxyphenyl) sorbic acid for the sorbic acid of Example 1, there is obtained the desired product.

EXAMPLE 9

2,3,4,5-tetrahydro-2-[3-(m-ethylphenyl)propenyl]-1,5-benzothiazepine, hydrochloride Following the procedures of Examples 1 and 6, but substituting equivalent amounts of 6-(m-ethylphenyl)sorbic acid for the sorbic acid in Example 1 and the resulting 2,3-dihydro-2-[3-(m-ethylphenyl)propenyl] - 1,5 - benzothiazepin-4(5H)-one for the 2,3-dihydro-2-propenyl-1,5-benzothiazepin-4(5H)-one of Example 6, the desired product is obtained.

EXAMPLE 10

5-[2-(diethylamino)ethyl]-2,3 - dihydro - 2-[3-(p-nitrophenyl)propenyl]-1,5-benzothiazepine-4(5H)-one, salt with one mole of citric acid Following the procedures of Examples 1 and 3, but substituting equivalent amounts of 6-(p-nitrophenyl)sorbic acid for the sorbic acid of Example 1, the resulting 2,3-dihydro-2-[3-(p-nitrophenyl)-propenyl]-1,5 - benzothiazepin-4(5H)-one for the 2,3-dihydro-2-propenyl-1,5-benzothiazepine-4(5H)-one of Example 3, the desired product is obtained.

EXAMPLE 11

5-[4-(2-pyrrolidyl)butyl]-2,3-dihydro-2-propenyl-1,5-benzothiazepin-4(5H)-one

Following the procedure of Example 2, but substituting an equivalent amount of 4-(2-pyrrolidyl)butyl bromide for the 2-dimethylaminoethyl bromide, the desired product is obtained.

EXAMPLE 12

5-[2-(diethylamino)ethyl] - 2,3 - dihydro - 2 - propenyl-8-ethylbenzothiazepin-4(5H)-one, salt with one mole of citric acid Following the procedure of Examples 1 and 3, but substituting an equivalent amount of 5-ethyl-2-aminobenzenethiol for the 2-aminobenzenethiol, the desired product is obtained.

EXAMPLE 13

5-[2-(dimethylamino)ethyl]-2,3-dihydro-2-propenyl-7-trifluoromethylbenzothiazepin-4(5H)-one Following the procedures of Examples 1 and 2, but substituting an equivalent amount of 4-trifluoromethyl-2-aminobenzenethiol for the 2-aminobenzenethiol of Example 1, there is obtained the desired product.

EXAMPLE 14

5-[2-(diethylamino)ethyl] - 2,3-dihydro - 2-propenyl-6,7-dimethoxybenzothiazepin - 4(5H)-one, salt with one mole of citric acid Following the procedures of Examples 1 and 3, but substituting an equivalent amount of 3,4-dimethoxy-2-aminobenzenethiol for the 2-aminobenzenethiol of Example 1, there is obtained the desired product.

EXAMPLE 15

5-[2 - (dimethylamino)ethyl]-2,3-dihydro-2-propenyl-1,5-benzothiazepin-4-(5H)-one, methobromide By treating the free base of Example 2 with methyl bromide in the presence of acetonitrile, the desired product is obtained.

EXAMPLE 16

2,3-dihydro-3-methyl-2-propenyl-1,5-benzothiazepin-4-(5H)-one

Following the procedure of Example 1, but substituting an equivalent amount of 2-methyl sorbic acid for the sorbic acid, the desired product is obtained.

What is claimed is:

1. A compound of the formula

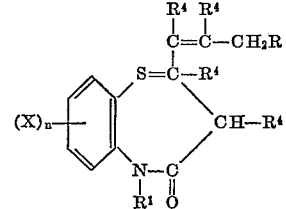

stereoisomers and salts thereof, wherein R is selected from the group consisting of hydrogen and (X')ₙ-substituted aryl; R¹ is selected from the group consisting of hydrogen, lower alkyl, lower alkenyl, lower alkynyl and the radical —AB wherein A is lower alkylene and B is a basic nitrogen containing radical selected from the group consisting of amino, lower alkyl amino, dilower-alkyl amino, hydroxy-lower alkyl amino, di(hydroxy-lower alkyl)amino, phenyl-lower alkyl amino and saturated N-containing heterocyclics having 5 to 7 atoms in the ring selected from the group consisting of piperidyl, lower alkyl piperidyl, hydroxy piperidyl, lower alkoxy piperidyl, morpholino, lower alkyl morpholino, lower alkoxy morpholino, thiamorpholino, lower alkyl thiamorpholino, di(lower alkyl) thiamorpholino, lower alkoxy thiamorpholino, piperazyl, lower alkyl piperazyl, di(lower alkyl)piperazyl, lower alkoxy piperazyl, hydroxy-lower alkyl piperazyl, alkanoyloxy-lower alkyl piperazyl, di(lower alkyl)amino-lower alkyl piperazyl, di(lower alkyl)amino-lower alkoxy-lower alkyl piperazyl, arylpiperazino, homopiperazino, lower alkyl homopiperazino, lower alkoxy homopiperazino and phenyl-lower alkyl homopiperazino, wherein the alkanoyl group consists of radicals containing up to 14 carbon atoms, and the aryl group is selected from the group consisting of phenyl, 3,4-methylenedioxyphenyl, 3,4-ethylenedioxyphenyl, furyl, thienyl, naphthyl and pyridyl; $R^4$ is selected from the group consisting of hydrogen and lower alkyl, at least three of $R^4$ being hydrogen; X and X' are each selected from the group consisting of hydrogen, lower alkyl, lower alkoxy, amino, di(lower alkyl)amino, halo lower alkylthio, hydroxy, cyano, nitro and trifluoromethyl; and $n$ is an integer from one to three.

2. A compound in accordance with claim 1 wherein R is hydrogen; R' is selected from the group consisting of hydrogen, methyl, dimethylaminoethyl, diethylaminoethyl and 4-methyl-1-piperazinyl propyl; and X is hydrogen.

3. A compound of the formula

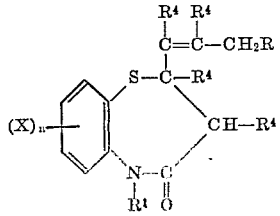

stereoisomers and salts thereof, wherein R is selected from the group consisting of hydrogen and $(X')_n$-substituted aryl; $R^1$ is selected from the group consisting of hydrogen, lower alkyl, lower alkenyl, lower alkynyl and the radical —AB wherein A is lower alkylene and B is a basic nitrogen containing radical selected from the group consisting of diloweralkyl amino, piperidino, N-lower alkyl piperazino, morpholino, and pyrrolidyl; $R^4$ is selected from the group consisting of hydrogen and lower alkyl, at least three of $R^4$ being hydrogen; X and X' are each selected from the group consisting of hydrogen, lower alkyl, lower alkoxy, amino, di(lower alkyl) amino, halo, lower alkylthio, hydroxy, cyano, nitro and trifluoromethyl; and $n$ is an integer from one to three.

4. 5-[2-(dimethylamino)ethyl]-2,3-dihydro-2-propenyl-1,5-benzothiazepin-4(5H)-one.

5. 5-[2-(diethylamino)ethyl]-2,3-dihydro-2-propenyl-benzothiazepin-4(5H)-one.

6. 2,3-dihydro-5-[3-(methyl-1-piperazinyl) propyl]-2-propenyl-1,5-benzothiazepin-4(5H)-one, dihydrochloride.

7. 2,3-dihydro-5-methyl-2-propenyl-1,5-benzothiazepin-4(5H)-one.

8. 2,3-dihydro-2-propenyl-1,5-benzothiazepin-4(5H)-one.

No references cited.

HENRY R. JILES, Primary Examiner

R. T. BOND, Assistant Examiner

U.S. Cl. X.R.

260—999

UNITED STATES PATENT OFFICE
CERTIFICATE OF CORRECTION

Patent No. 3,455,902   Dated July 15, 1969

Inventor(s)   John Krapcho

It is certified that error appears in the above-identified patent and that said Letters Patent are hereby corrected as shown below:

In column 2, line 19, "containign" should read - - containing - -; and on line 22, "fro mthe" should read - - from the - -. In column 4, formula (IV), that portion of the formula reading

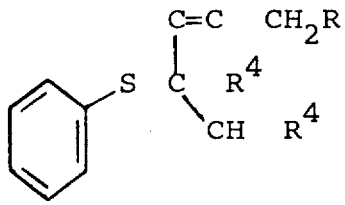   should read   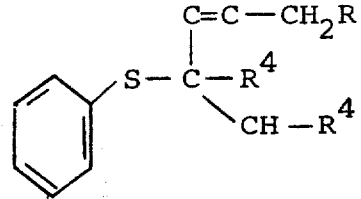

and in formula (V), that portion of the formula reading

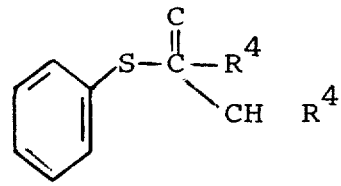   should read   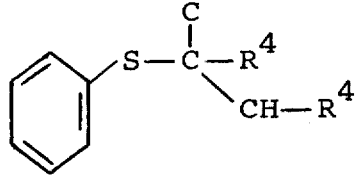

In column 5, line 9, "aminobenezenethiol" should read - - aminobenzenethiol - -; and on lines 49 and 50, "1 hour" should read - - 7 hours - -; and on line 62, "solids" should read - - solid - -. In column 8, claim 1, that portion of the formula reading

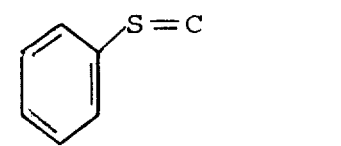   should read   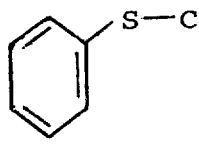

In column 10, line 18, "[3-(methyl" should read - - [3-(4-methyl - -.

SIGNED AND SEALED
APR 28 1970

(SEAL)
Attest:

Edward M. Fletcher, Jr.
Attesting Officer

WILLIAM E. SCHUYLER, JR.
Commissioner of Patents